June 5, 1928.
L. H. LEHMAN
1,672,419
CORNER JOINT
Filed Aug. 13, 1927
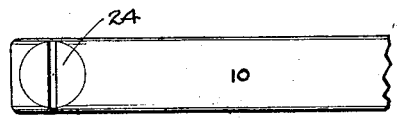
Fig. 1
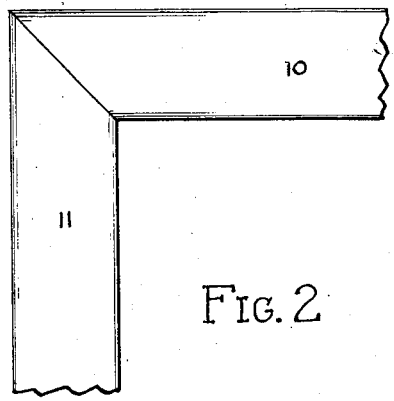
Fig. 2
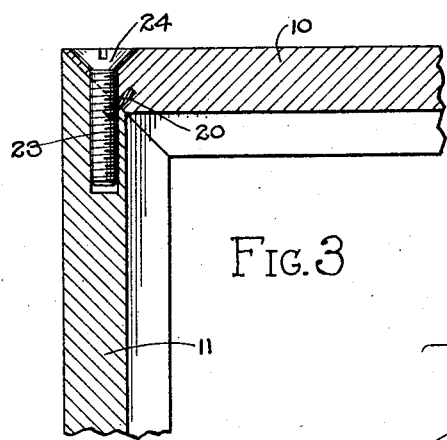
Fig. 3
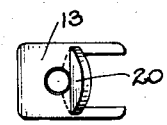
Fig. 4
Fig. 5
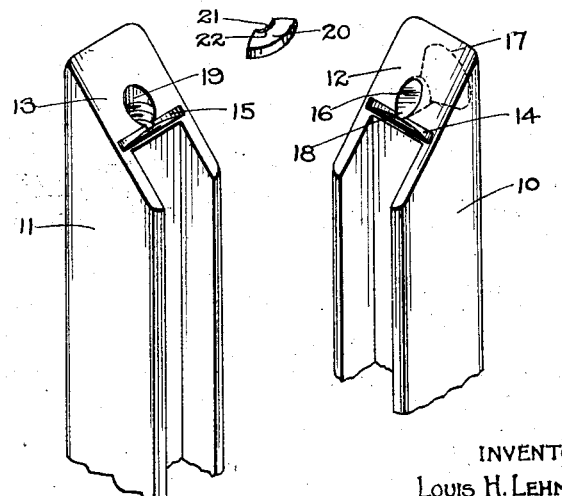
INVENTOR
Louis H. Lehman
By Leon Edelson
ATTORNEY Patented June 5, 1928.

1,672,419

UNITED STATES PATENT OFFICE.

LOUIS H. LEHMAN, OF PHILADELPHIA, PENNSYLVANIA.

CORNER JOINT.

Application filed August 13, 1927, Serial No. 212,754, and in Canada October 23, 1926.

This invention relates to joints in general and more particularly to improvements in corner joints for rigidly securing together adjacent structural frame members.

Among the principal objects of this invention is the provision of a joint between adjacent structural frame members which is of such character as to effectually preclude all possibility of the members becoming relatively displaced with respect to one another. The attainment of this object becomes of paramount importance in those cases where several members are to be joined together to provide, for example, a frame for a glass, it being obviously necessary in such instance to provide means for insuring that all of the frame members be arranged to lie in a common plane and that relative twisting of the members about the joints be prevented.

A further object of the invention is the provision of a corner joint between abutting members arranged to lie in a common plane, the joint being provided with interlocking means adapted to prevent the twisting or turning of either one of the jointed members such that it no longer lies in said common plane.

A still further object of the invention is the provision of a corner joint which is at once as simple in construction and inexpensive in manufacture as it is efficient in use and neat in external appearance.

A still further object of the invention is the provision of a joint between adjacent members which is designed to permit said members to be assembled and separated with equal facility and ease.

Other objects, and objects relating to details of construction and assembly, will appear more fully hereinafter.

The invention consists substantially in the construction, combination, arrangement and relative location of parts, all as will be explained more fully hereinafter, as illustrated in the accompanying drawings, and finally pointed out in the appended claims.

In the drawings, which show for purposes of illustration a preferred embodiment of the principles of this invention:

Figures 1 and 2 are top plan and side views, respectively, of a pair of members joined together in accordance with this invention;

Figure 3 is a vertical longitudinal section through said jointed members showing the relative arrangement of the means for holding said members together;

Figure 4 is a top plan view of one of the jointed members showing an interlocking key in association therewith; and Figure 5 is a view showing separately and in perspective the two members to be joined together and their interlocking key.

Referring now to the drawings, it will be seen that for purposes of illustration, and for no other reason, the members to be joined together have been shown as being substantially channel-shaped in cross section; these members being respectively designated by the reference numerals 10 and 11. In the particular instance illustrated, the members when joined together, as appears most clearly in Figures 2 and 3, form a right angle, but is to be understood, of course, that the members may form either acute or obtuse angles without necessitating any changes in the construction of joint to be hereinafter described.

The abutting ends of the members 10 and 11 are each mitered, as at 12 and 13 respectively, the mitered surface 12 being provided with a transversely extending groove or recess 14, while the mitered surface 13 is provided with a similar groove or recess 15. These grooves 14 and 15 are so arranged as to be in registry with each other when the members 10 and 11 are in assembled relation (see Figure 3), the combined recess thus formed by the registering grooves lying in a plane which is normal to the common plane of the mitered surfaces 12 and 13.

The member 10 is provided at its mitered end with an opening 16, the axis of which extends at right angles to the longitudinal axis of said member and intersects the mitered surface 12 thereof. As appears most clearly in Figure 5, the outer end of this opening 16 is countersunk, as at 17, while the inner end thereof intersects slightly, as at 18, the transverse groove or recess 14 in the mitered surface 12.

The member 11 is in turn provided at its mitered end with an interiorly threaded screw hole 19 arranged for coaxial alignment with the opening 16 in the member 10 when the latter is in assembled relation with respect to the member 11. As appears most clearly in Figures 3 and 5 it will be seen that this screw hole is so located with respect to the groove or recess 15 that the bottom of the latter is in direct communication with one side of said hole. In other words, the groove 15 and the screw hole 19 intersect one another.

An interlocking key 20 of the shape more particularly shown in Figure 5 is arranged to be commonly received by the grooves 14 and 15 when the members 10 and 11 are in assembled relation. This key 20 is of generally elliptical shape, one edge thereof being arcuately notched, as at 21. The grooves or recesses 14 and 15 are curved in depth to correspond to the curvature of the edges of the key 20, the latter being normally seated within the groove 15 with its notched edge presenting downwardly and toward the screw hole 19. (See Figure 4.) With the key 20 in the position just mentioned, the edge of the notched portion 21 forms a continuation of the wall of the screw hole 19, this notched portion being further provided with one or more threads 22 corresponding to the interior threads of said hole. A screw 23 passing through the opening 16 in the member 10 is threaded into the hole 19, the threaded shank thereof engaging simultaneously the threads of said hole and of said key 20. The head 24 of the screw is arranged for accommodation within the countersunk portion 17 of the member 10, thereby lending a smooth and finished external appearance to the joint.

It will be evident that a joint constructed in the manner illustrated and described effectually precludes any tendency for the members 10 and 11 to twist or turn with respect to one another. The screw 23 serves to prevent longitudinal displacement of the members, while the key 20, which constitutes an interlock between said members, prevents their being laterally displaced or twisted out of position with respect to each other. Not only does the interlock 20 serve as an effective means for preventing one or the other of the members from twisting, but it also serves to prevent the members from sliding or shifting relatively to each other along the common plane of their mitered surfaces, thereby relieving the screw from all lateral strains or stresses. Also by reason of the positive engagement which is had between the screw 23 and the interlock 20, lost motion between the several parts of the joint is eliminated with the result that a very substantial and rigid joint is obtained.

It is to be understood that various changes may be made from time to time in the construction and design of the joint herein described without departing from the real spirit and principles of the invention, and it is accordingly intended to claim the same broadly as well as specifically as indicated by the appended claims.

What is claimed as new and useful is:

1. In a joint of the character described, a pair of members arranged in abutting relation, each of said members being provided with a transversely extending slot, an interlocking member commonly received in both of said slots, and a securing device passing through one of said members for threaded engagement with the other thereof, said device being also in threaded engagement with said interlocking member.

2. In a joint of the character described, a pair of members arranged in abutting relation, each of said members being provided with a transversely extending slot, an interlocking member commonly received in both of said slots, said member lying in a plane normal to the plane of the joint, and a screw passing through one of said members for threaded engagement with the other, said screw being angularly disposed with respect to the plane of said joint for threaded engagement with said interlocking member.

3. In a joint of the character described, a pair of members arranged in abutting relation, a screw passing freely through one of said members and into threaded engagement with the other thereof, and means commonly received between the meeting faces of said members and engaging the shank of said screw for relieving the latter of all lateral stresses or strains.

4. In a joint of the character described, a pair of members arranged to be disposed in abutting relation, one of said members being provided with an opening forming an acute angle with a slot arranged in the end thereof, the other of said members being provided with an opening forming an obtuse angle with a slot arranged in the end thereof, said openings and said slots being respectively arranged for registry with each other, means passing through said registering openings for securing said members together, and means received within said registering slots and arranged for interlocking engagement with said securing means.

5. In a joint of the character described, a pair of members arranged in abutting relation, an interlocking device received between said members and intersecting the plane of the joint, said device being threaded in one edge thereof, and a screw passing through one of said members and into threaded engagement with both the other member and the threaded edge of said interlocking device.

6. In a joint of the character described, a pair of members arranged in abutting relation, the meeting surfaces thereof being each provided with a transversely extending slot whereby to provide a recess extending to either side of the plane of the joint, one of said members being also provided with an interiorly threaded socket partially intersecting said recess, an interlocking key received within said recess and having a portion thereof intersecting said socket, said portion being threaded to correspond with the threads in said socket, and a screw passing through the other of said members and into threaded engagement with both said socket and said threaded portion of the interlocking key.

7. In a joint of the character described, a pair of members arranged in abutting relation, a screw passing freely through one of said members and into threaded engagement with the other thereof, and means commonly received between the meeting faces of said members and extending substantially at right angles to the plane of said faces for relieving said screw of all lateral strains and stresses.

In testimony whereof, I have hereunto affixed my signature.

LOUIS H. LEHMAN.